(12) United States Patent
Horigome et al.

(10) Patent No.: US 10,213,947 B2
(45) Date of Patent: Feb. 26, 2019

(54) INJECTION DEVICE AND RESIN INJECTION METHOD

(71) Applicant: NISSEI ASB MACHINE CO., LTD., Nagano (JP)

(72) Inventors: Hiroshi Horigome, Komoro (JP); Yasuhiro Hidaka, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 131 days.

(21) Appl. No.: 15/134,591

(22) Filed: Apr. 21, 2016

(65) Prior Publication Data

US 2016/0297129 A1    Oct. 13, 2016

Related U.S. Application Data

(60) Division of application No. 13/467,446, filed on May 9, 2012, now abandoned, which is a continuation of
(Continued)

(30) Foreign Application Priority Data

Nov. 25, 2009    (JP) ................................. 2009-268144

(51) Int. Cl.
| | |
|---|---|
| *B29C 45/57* | (2006.01) |
| *B29B 11/08* | (2006.01) |
| *B29C 45/54* | (2006.01) |
| *B29C 45/50* | (2006.01) |

(Continued)

(52) U.S. Cl.
CPC .............. *B29C 45/57* (2013.01); *B29B 11/08* (2013.01); *B29C 45/50* (2013.01); *B29C 45/54* (2013.01);
(Continued)

(58) Field of Classification Search
CPC ......... B29C 45/50; B29C 45/54; B29C 45/57; B29K 2105/253; H01L 21/02052
See application file for complete search history.

(56) References Cited

U.S. PATENT DOCUMENTS

| | | | |
|---|---|---|---|
| 4,632,652 | A | 12/1986 | Farrell |
| 5,071,341 | A | 12/1991 | Poehlsen |

(Continued)

FOREIGN PATENT DOCUMENTS

| | | | |
|---|---|---|---|
| DE | 2639155 | A1 | 4/1977 |
| DE | 4221423 | A1 | 1/1994 |

(Continued)

OTHER PUBLICATIONS

International Search Report, International Application No. PCT/JP2010/068085.

(Continued)

*Primary Examiner* — Robert J Grun
(74) *Attorney, Agent, or Firm* — David L. Hoffman; Hoffman Patent Group (57) ABSTRACT

As an injection screw 2 applies pressure, a holding pressure plunger 22 is moved backward under the pressure of a resin to flow the resin into a holding pressure path 9, and the resin in a resin path 6 is pressurized (primary holding pressure process). A shutoff plunger 12 is closed, and the resin in the resin path 6 and the holding pressure path 9 is pressurized by the holding pressure plunger 22 (secondary holding pressure process). Further, the shutoff plunger 12 is opened, and the holding pressure plunger 22 is moved forward until its tip projects into the resin path 6 to discharge all the resin in the holding pressure path 9 to the resin path 6, whereby the resin beside the injection screw 2 as compared with the shutoff plunger 12 is held with respect to the holding pressure path 9.

7 Claims, 4 Drawing Sheets

Related U.S. Application Data application No. PCT/JP2012/068085, filed on Oct. 14, 2010.

(51) Int. Cl.
    *B29K 105/00*     (2006.01)
    *B29K 67/00*     (2006.01)
    *B29L 31/00*     (2006.01)

(52) U.S. Cl.
    CPC .. *B29K 2067/003* (2013.01); *B29K 2105/253* (2013.01); *B29L 2031/7158* (2013.01)

(56) References Cited

U.S. PATENT DOCUMENTS

| | | |
|---|---|---|
| 5,219,512 A | 6/1993 | Tsutsumi |
| 5,509,797 A | 4/1996 | Nakamura |
| 6,017,210 A | 1/2000 | Takayama et al. |
| 6,196,820 B1 | 3/2001 | Straka |

FOREIGN PATENT DOCUMENTS

| | | | |
|---|---|---|---|
| GB | 2116903 A | 10/1983 |
| JP | H01241418 A | 9/1989 |
| JP | 09085790 A | 3/1997 |
| JP | 2002-192560 A | 7/2002 |
| JP | 2002-240114 A | 8/2002 |
| JP | 2003-205530 | 7/2003 |

OTHER PUBLICATIONS

European Search Report, Application No. 10832990.5-1706/2505334 PCT/JP2010/068085.

INJECTION DEVICE AND RESIN INJECTION METHOD

BACKGROUND OF THE INVENTION

Field of the Invention

This invention relates to an injection device equipped with a means for maintaining the pressure of a resin in a resin path of an injection nozzle.

The present invention also relates to a resin injection method for injecting the resin, with the pressure of the resin being maintained in the resin path of the injection nozzle.

Description of the Related Art

PET bottles, for example, are frequently used as bottles for potable water, etc. The PET bottle is produced in the shape of a bottle by forming a test tube-shaped preform with the use of an injection molding device (injection device), and blow-molding the preform.

As the injection device for forming the preform, an in-line screw type injection device is known (see, for example, Patent Document 1). With the injection molding of a resin by the in-line screw type injection device, a metering step of supplying a new resin material into an injection cylinder, an injection step of extruding and charging the resin material into a mold, and a holding pressure (dwelling) step of maintaining the pressure of the resin material within a resin path are repeatedly performed.

After the injection step and the holding pressure step are completed and before the injection step of a next cycle is started, cooling of a molded product, mold opening, withdrawal of the molded product, and mold closing are carried out. During this process, the metering step is performed. To carry out the molding cycle unerringly in a short period of time, in the holding pressure step, the resin path is closed by a dedicated plunger or the like to maintain the pressure of the resin material. During this period, an injection screw is moved backward, and a new resin material is supplied into the injection cylinder.

With the hitherto known injection device, in case the pressure of the resin material is maintained, the resin path is pressurized by a holding pressure mechanism. In the holding pressure step for the resin material, therefore, the resin has flowed into the resin charging site of the holding pressure mechanism (the holding pressure mechanism and the resin are in contact). If the resin flowing into the holding pressure mechanism (charging site) resides there, various deficiencies such as burn marks are induced. Thus, the resin flowing into the holding pressure mechanism needs to be discharged into the resin path to eliminate residence.

In the field of an injection machine equipped with the holding pressure mechanism, therefore, it is under consideration to discharge the resin for holding pressure reliably into the resin path for injection, without upsizing or complicating instruments. In the small-sized injection machine field, in particular, since the device is small in size, an installation space is limited, and a complicated mechanism cannot be adopted.

SUMMARY OF THE INVENTION

The present invention has been accomplished in the light of the above-mentioned circumstances. It is an object of the present invention to provide an injection device and a resin injection method which can reliably eliminate the residence of the resin even with the use of an inexpensive holding pressure mechanism.

The injection device in accordance with a first embodiment of the present invention, intended to attain the above object, is an injection device, includes: an injection nozzle, mounted on a front end of an injection cylinder, for injecting a resin, which has been charged into the injection cylinder, through a resin path by an injection screw; shutoff means mounted in the injection nozzle and capable of shutting off the resin path; a holding pressure path formed in the injection nozzle on a side toward an injection front end as compared with the shutoff means, and communicating with the resin path so that the resin can freely flow thereinto; and holding pressure means disposed reciprocatably in the holding pressure path, given a pressing force to press the resin in the holding pressure path toward the resin path, and moved in a direction opposite to a pressing direction by the resin flowing into the holding pressure path when the pressing force is released, wherein when a pressure of the resin path of the injection nozzle is to be maintained, shutoff of the resin path by the shutoff means is released, and the injection screw is pressurized to hold the resin in the resin path and the holding pressure path, then the resin path is shut off by the shutoff means, and the pressing force is imparted to the holding pressure means to continue holding of the resin in the resin path and the holding pressure path by the holding pressure means, and further the shutoff of the resin path by the shutoff means is released, and all the resin in the holding pressure path is discharged to the resin path by the holding pressure means.

With the present invention in accordance with the first embodiment, shutoff of the resin path is released, and the injection screw is pressurized to hold the resin in the resin path and the holding pressure path, then the resin path is shut off by the shutoff means, and the pressure of the resin in the resin path and the holding pressure path is maintained by the holding pressure means, and further with the shutoff of the resin path by the shutoff means being released, all the resin in the holding pressure path is discharged to the resin path. Thus, during holding pressure, charging of the resin into the injection cylinder becomes possible. In this state, the resin can be held beside the injection screw as compared with the shutoff means to eliminate the residence of the resin. Consequently, the residence of the resin in the holding pressure mechanism can be eliminated reliably without the need to use an extensive mechanism.

When the resin path is shut off by the shutoff means and the pressure of the resin in the resin path and the holding pressure path is maintained by the holding pressure means, charging of the resin into the injection cylinder can be started. Thus, the charging time can be ensured sufficiently. Hence, the rotational speed of the injection screw can be lowered. Furthermore, the barrel whose temperature is to be set can be lowered in temperature, and the occurrence of acetaldehyde can be decreased.

The injection device in accordance with a second embodiment is the injection device according to the first embodiment, wherein the holding pressure means is given the pressing force, whereby a tip site thereof is projected into the resin path, and the tip site of the holding pressure means is projected into the resin path, whereby all the resin in the holding pressure path is discharged to the resin path.

With the invention according to the second embodiment, all the resin in the holding pressure path is discharged to the resin path by projecting the tip site of the holding pressure means into the resin path. Thus, the resin in the holding pressure path can be reliably discharged to the resin path with a very simple structure.

The injection device of the present invention according to a third embodiment is the injection device according to the first or second embodiment, wherein when the pressure of the resin path of the injection nozzle is to be maintained, the resin path is shut off by the shutoff means to continue the holding of the resin in the resin path and the holding pressure path, then, with the resin path being shut off, the pressing force is exerted on the holding pressure means, an inlet path for the resin on a mold side is shut off, and the pressing force on the holding pressure means is once released, and then the shutoff of the resin path is released, and the pressing force is exerted again on the holding pressure means to discharge all the resin in the holding pressure path to the resin path.

With the present invention according to the third embodiment, the inlet path for the resin on the mold side is shut off, and the pressing force of the holding pressure means is once released (the pressure is once reduced: decompression). Then, the shutoff of the resin path is released, and the pressing force is given again to the holding pressure means to discharge all the resin in the holding pressure path to the resin path. Thus, the molten resin can be maintained in the optimum state, also at a time when the molded product is removed from the mold.

The injection device of the present invention according to a fourth embodiment is the injection device according to any one of the first, second or third embodiments, wherein when the resin path is shut off by the shutoff means after the resin is held in the resin path and the holding pressure path by the pressurization of the injection screw, the injection screw is rotationally operated in a reverse direction to charge the resin into the injection cylinder.

With the present invention according to the fourth embodiment, the resin can be charged into the injection cylinder by shutting off the resin path by the shutoff means and rotationally operating the injection screw in the reverse direction.

The resin injection method of the present invention according to fifth embodiment, intended to attain the aforementioned object, is a resin injection method for injecting a resin from an injection nozzle through a resin path and flowing the resin into a holding pressure path communicating with the resin path to maintain a pressure of the resin in the resin path and the holding pressure path, comprising: pressurizing the resin in the resin path to hold the resin in the resin path and the holding pressure path; then shutting off the resin path and pressurizing the holding pressure path to perform holding pressure of the resin path and the holding pressure path; and further releasing shutoff of the resin path and discharging all the resin held in the holding pressure path to the resin path under pressure.

With the present invention according to the fifth embodiment, the resin is discharged even toward the injection screw as compared with the shutoff site, and all the resin is held in the resin path, whereby the residence of the resin in the holding pressure path can be eliminated. Hence, the residence of the resin in the holding pressure mechanism can be eliminated reliably.

The resin injection method of the present invention according to a sixth embodiment is the resin injection method according to the fifth embodiment, further comprising shutting off the resin path by the shutoff means and pressurizing the holding pressure path to hold the resin in the resin path and the holding pressure path, shutting off an inlet path for the resin on a mold side and releasing pressurization of the holding pressure path once, and then releasing shutoff of the resin path and pressurizing the holding pressure path again to discharge all the resin in the holding pressure path to the resin path.

With the present invention according to the sixth embodiment, the molten resin can be maintained in the optimum state all the time, including a time when the molded product is removed from the mold.

The present invention makes it possible to provide an injection device and a resin injection method which can reliably eliminate the residence of a resin, even with the use of a holding pressure mechanism which is not extensive and not expensive.

DESCRIPTION OF THE PREFERRED EMBODIMENT(S)

Mode for Carrying Out the Invention

The configuration of the injection device according to the embodiment of the present invention will be described based on FIG. 1 and FIGS. 2A and 2B. The illustrated injection device is intended to be applied, for example, as an injection device for forming a preform in the shape of a test tube during the process for preparing a beverage bottle from a resin. An injection-molded product applied in the present invention is not limited to the preform, and the injection device of the present invention can be used as an injection device for obtaining various molded products.

Figure 1:
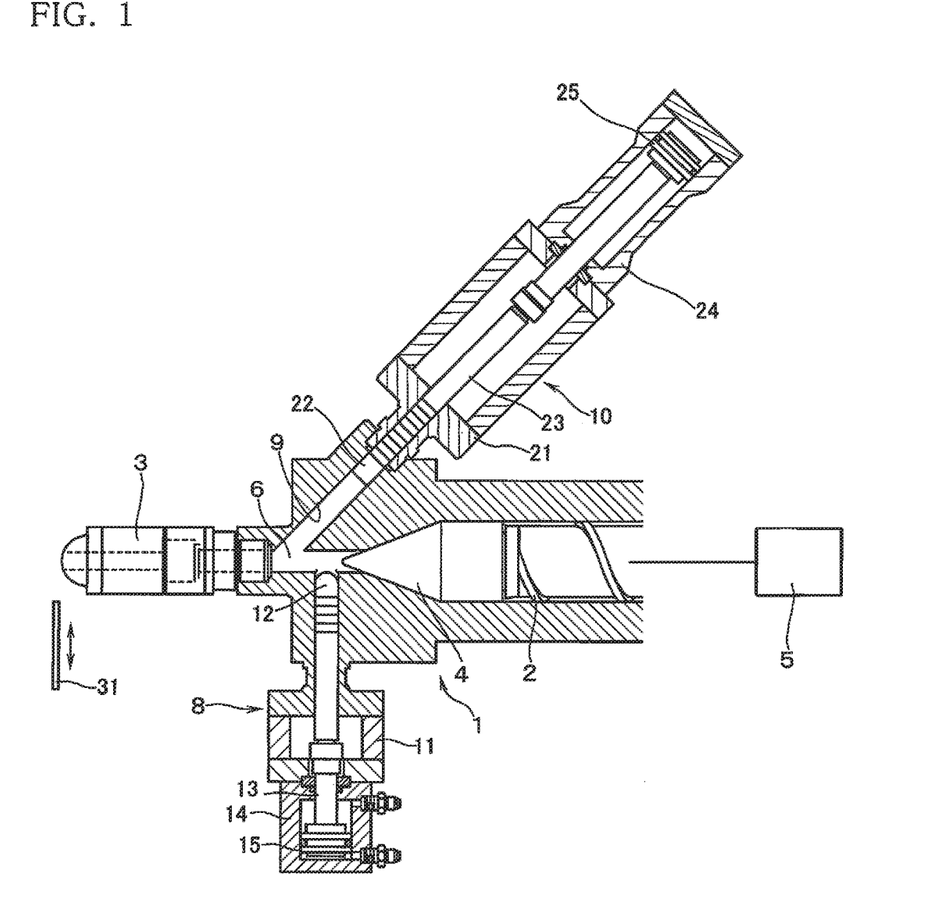
FIG. 1 is a sectional view showing essential parts of an injection device according to an embodiment of the present invention.
Figure 2A:
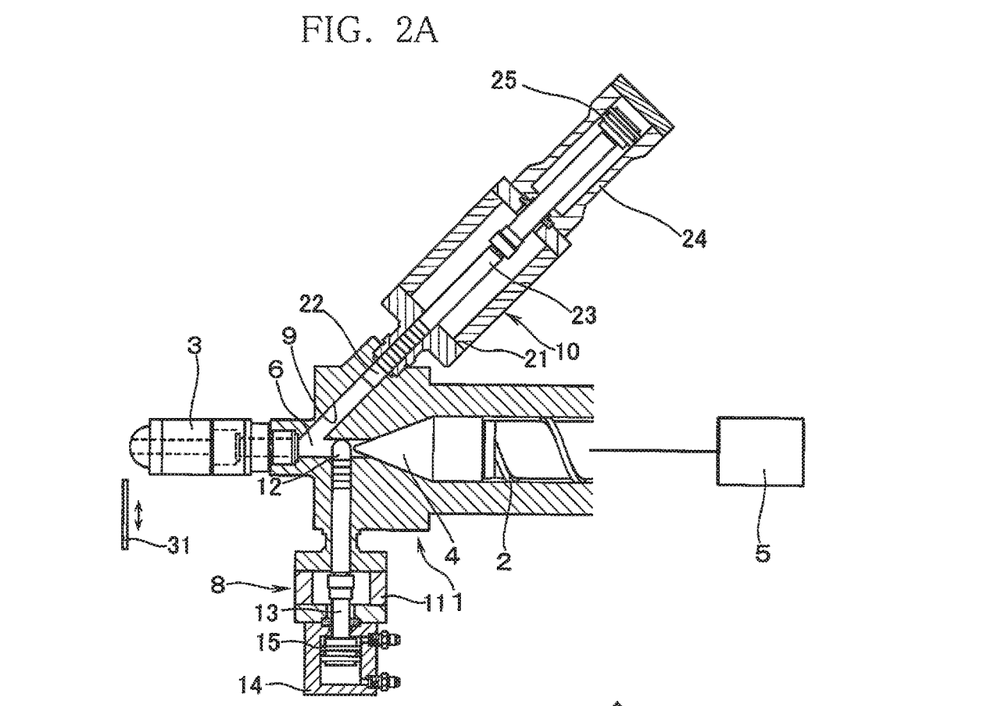
FIGS. 2A and 2B are sectional views showing the essential parts of the injection device according to the embodiment of the present invention.
Figure 2B:
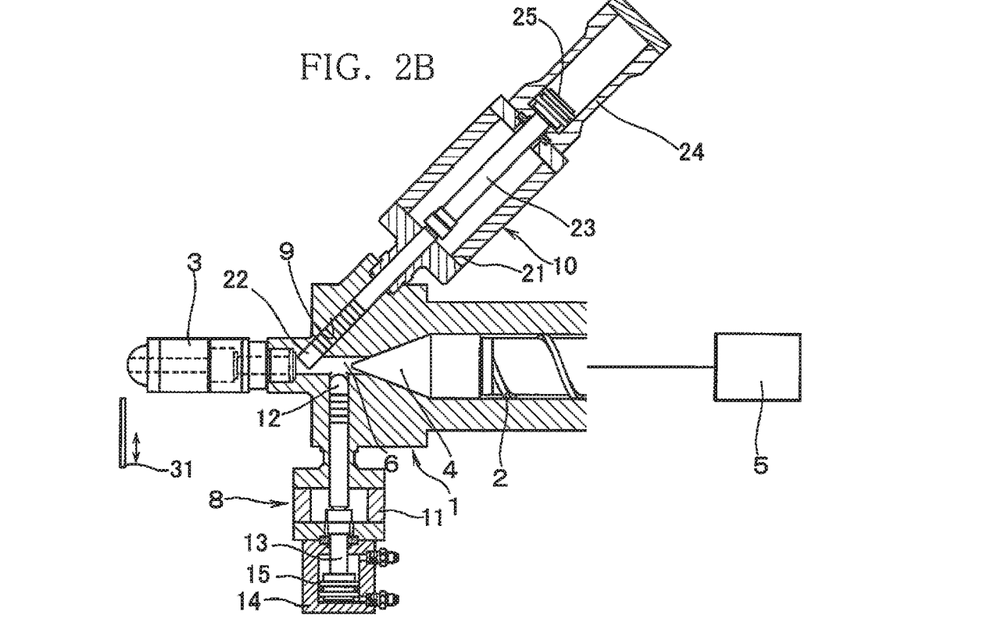

FIGS. 1, 2A and 2B show the sectional state of a leading end portion (an injection nozzle portion) of the injection device according to the embodiment of the present invention, in which FIG. 1 shows a state where a resin is injected, FIG. 2A shows a state where a resin path is closed to maintain the pressure of the resin, and FIG. 2B shows a state where the resin path is opened, and the pressure of the resin is maintained. Behind the injection nozzle, a hopper for supplying a molding material, a drive device for rotationally driving an injection screw, and so on are provided, although these members are not shown.

As shown in the drawings, an injection screw 2 is supported inside an injection cylinder 1, and an injection nozzle 3 is mounted at the front end of the injection cylinder 1. A hopper for supplying a molding material is connected to the injection cylinder 1, and the molding material is supplied into the injection cylinder 1.

A screw head 4 is provided at the front end of the injection screw 2, and the injection screw 2 is rotationally driven to plasticize the resin heated and melted within the injection cylinder 1. As the molten resin is charged ahead of the screw head 4, the injection screw 2 is moved backward. Upon completion of the charging of the molten resin, an injecting drive cylinder 5 is driven to move the injection screw 2 forward, performing the injection of the molten resin.

A resin path 6 is formed inside the injection cylinder 1, and the injection nozzle 3 is connected to the front end of the resin path 6. The injection nozzle 3 is connected to a mold via a hot runner (not shown). A shutoff device 8, as a shutoff means, is connected in an integral state to the injection nozzle 3, and the resin path 6 is free to be shut off by the shutoff device 8. At a site of the injection nozzle 3 toward the leading end in the injection direction with respect to the shutoff device 8 (i.e., the site leftward of the shutoff device 8 in the drawings), a holding pressure path 9 communicating with the resin path 6 is formed. The holding pressure path 9 is formed to be inclined rearwardly (rightwardly in the drawings) with respect to the resin path 6, and the resin charged into the holding pressure path 9 and the resin path 6 has its pressure maintained by a holding pressure device 10.

The shutoff device 8 is equipped with a shutoff cylinder 11 integrated with the injection cylinder 1, and a piston rod portion 13 of a shutoff plunger 12 is reciprocatably supported in the shutoff cylinder 11. A shutoff drive cylinder 14 is connected to the shutoff cylinder 11, and a shutoff piston 15 is reciprocatably supported in the shutoff drive cylinder 14. The shutoff drive cylinder 14 is supplied with a pressure oil, and the pressure oil is discharged from the shutoff drive cylinder 14, whereby the shutoff piston 15 is driven to reciprocate.

The shutoff piston 15 of the shutoff drive cylinder 14 is connected to the piston rod portion 13 of the shutoff plunger 12, and the shutoff plunger 12 is reciprocated (moved forward and backward) by the driving of the shutoff drive cylinder 14 via the shutoff piston 15 and the piston rod portion 13. As shown in FIGS. 2A and 2B, the shutoff plunger 12 moves forward (makes a closing motion), thereby shutting off (closing) the resin path 6 forward of the screw head 4.

The holding pressure device 10 is equipped with a holding pressure cylinder 21 integrated with the injection cylinder 1, and a piston rod portion 23 of a holding pressure plunger 22 is reciprocatably supported in the holding pressure cylinder 21. The holding pressure plunger 22 is disposed in the holding pressure path 9 so as to be capable of reciprocating (movable backwardly and forwardly). A tip portion of the holding pressure plunger 22 when located at a forward movement end position is disposed to project into the resin path 6. A holding pressure drive cylinder 24 is connected to the holding pressure cylinder 21, and a holding pressure piston 25 is supported in the holding pressure drive cylinder 24 so as to be drivable in a reciprocating manner. A pressure oil is supplied to the holding pressure drive cylinder 24 to impart a pressing force to the holding pressure piston 25, while a discharge path for the pressure oil is opened in the holding pressure drive cylinder 24 to release the pressing force by the holding pressure piston 25.

The holding pressure piston 25 of the holding pressure drive cylinder 24 is connected to the piston rod portion 23 of the holding pressure plunger 22, and the driving of the holding pressure drive cylinder 24 exerts the pressing force on the holding pressure plunger 22 via the holding pressure piston 25 and the piston rod portion 23. As shown in FIGS. 2A and 2B, when the pressing force is applied until the holding pressure plunger 22 is moved to the forward movement end position, the tip portion of the holding pressure plunger 22 is projected into the resin path 6. When the pressing force by the holding pressure piston 25 is released, the holding pressure plunger 22 is pushed by the resin from the resin path 6 and moved backward, with the result that the resin is charged into the holding pressure path 9.

A mold device at the site of the leading end of the injection nozzle 3 is equipped with a shutoff member 31. The shutoff member 31 is opened and closed in a manner interlocked with a holding pressure motion for the resin (to be described later) at the completion of injection. By the action of this shutoff member 31, the relation between the resin charged into the mold and the resin having its pressure maintained in the injection nozzle 3 is cut off.

When the resin in the resin path 6 is to have its pressure maintained in the above-mentioned injection device, the injecting drive cylinder 5 is driven, with the shutoff plunger 12 being open, to pressurize the injection screw 2. As a result, the holding pressure plunger 22 is moved backward under the pressure of the resin to flow the resin into the holding pressure path 9, and the resin in the resin path 6 is pressurized, as shown in FIG. 1. In this manner, primary holding pressure process is carried out. Then, as shown in FIG. 2A, the shutoff plunger 12 is closed to pressurize the holding pressure plunger 22 and pressurize the resin in the resin path 6 and the holding pressure path 9. In this manner, secondary holding pressure process is performed. Finally, as shown in FIG. 2B, the shutoff plunger 12 is opened, and the holding pressure plunger 22 is moved forward until its tip projects into the resin path 6, whereby the resin in the holding pressure path 9 is discharged to the resin path 6 toward the injection screw 2 as compared with the shutoff plunger 12.

With the above-described injection device, the cylinder diameters of the holding pressure cylinder 21 and the holding pressure drive cylinder 24, and the diameters (shapes) of the piston rod portion 23 and the holding pressure piston 25 are set, as appropriate, such that the resin pressure during injection set by the injecting drive cylinder 5 and the set pressure of the holding pressure drive cylinder 24 when actuating the holding pressure mechanism are equal to each other. It is also possible to perform internal arithmetic from the screw diameter of the injection screw 2 of the injection cylinder 1, and adjust the pressure of the holding pressure drive cylinder 24 of the holding pressure device 10 to the same set pressure as that of the injection cylinder 1.

The holding pressure path 9 is formed to be inclined rearwardly (rightwardly in the drawings) with respect to the resin path 6, and the holding pressure plunger 22 is disposed on the inclined holding pressure path 9. Thus, the holding pressure cylinder 21 and the holding pressure drive cylinder 24 are disposed to be inclined with respect to a direction perpendicular to the injection cylinder 1. Hence, it is minimally likely for the holding pressure cylinder 21 and the holding pressure drive cylinder 24 to interfere with surrounding instruments such as a cover. As a result, the device is not upsized, and the injection device equipped with the holding pressure cylinder 21 and the holding pressure drive cylinder 24 can be installed in a limited space. Consequently, the injection device has a structure which facilitates its application, for example, as an injection device for forming a test tube-shaped preform during the process of preparing a beverage bottle from a resin.

The motions of the above-described injection device will be explained concretely based on FIGS. 3A to 3F and FIG. 4.

FIGS. 3A to 3F show concepts illustrating the operating steps of the injection device. FIG. 4 shows a time chart of the working statuses of the respective constituent instruments conformed to the operating steps.

Figure 3A:
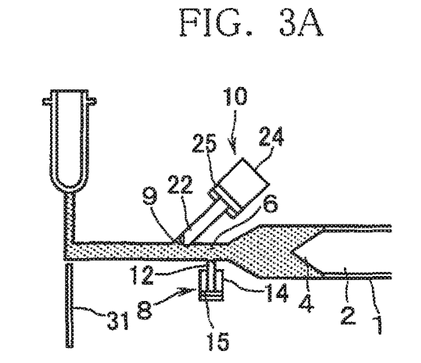
FIGS. 3A to 3F are explanation drawings showing the motions of the injection device.
Figure 4:
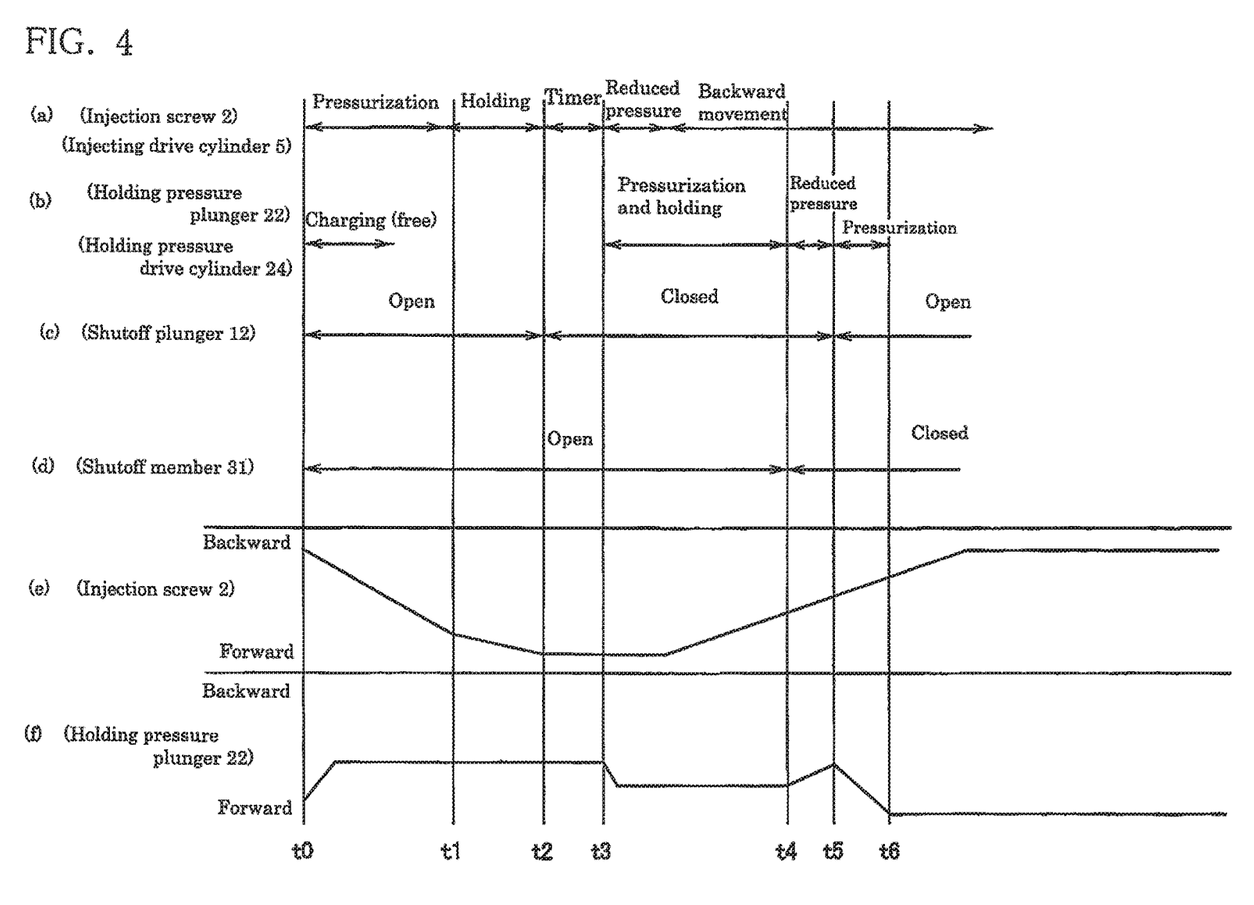
FIG. 4 is a time chart showing changes in the motions over time, where portions (a) to (f) represent different portions of the same overall chart.

As shown in FIG. 3A, at the start of injection, the pressing force of the holding pressure drive cylinder 24 is released and, in this state, the holding pressure plunger 22 is freed. At the same time, the shutoff drive cylinder 14 is driven to bring the shutoff plunger 12 into a retracted state (open state). In this state, the injecting drive cylinder 5 (see FIG. 1 and FIGS. 2A and 2B) is driven to pressurize the injection screw 2.

In the state shown in FIG. 3A as indicated by time t0 in FIG. 4, the injecting drive cylinder 5 is in a state where it can inject the resin as shown at portion (a) of the chart. Simultaneously with the injection of the resin into a preforming mold (mold), the holding pressure drive cylinder 24 is freed, charging of the resin into the holding pressure path 9 is also performed as shown at portion (b) of the chart, the shutoff plunger 12 is opened as shown at portion (c) of the chart, and the shutoff member 31 for the mold device is rendered open as shown at portion (d) of the chart. The injection screw 2 is located at the backward movement end position as shown at portion (e) of the chart, and the holding pressure plunger 22 is located at the forward movement end position as shown at portion (f) of the chart.

Figure 3B:
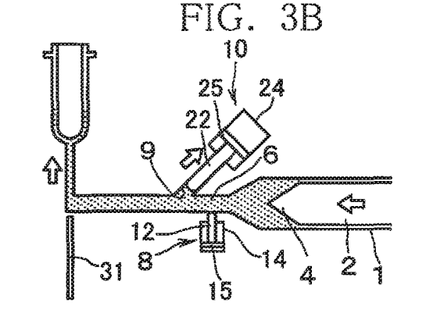

As shown in FIG. 3B, the injecting drive cylinder 5 is driven to pressurize the injection screw 2 and move it forward. The resin in the resin path 6 flows into the holding pressure path 9 to push back the holding pressure plunger 22 (charging). Simultaneously, the resin begins to be charged into the mold.

In the state shown in FIG. 3B, as indicated by the period from the time t0 until time t1 in FIG. 4, the injecting drive cylinder 5 is pressurized as shown at portion (a) of the chart, the holding pressure drive cylinder 24 is freed to charge the resin into the holding pressure path 9 as shown at portion (b) of the chart, the injection screw 2 advances from the backward movement end position as shown at portion (e) of the chart, and the holding pressure plunger 22 moves backward as shown at portion (f) of the chart.

Figure 3C:
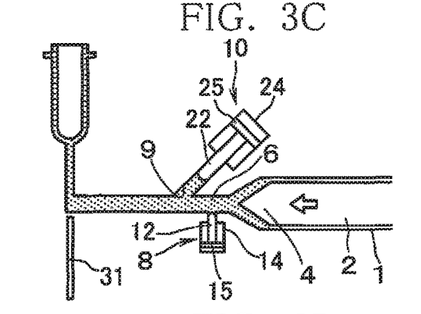

As shown in FIG. 3C, the resin in the resin path 6 flows into the holding pressure path 9 to push back the holding pressure plunger 22 further (charging), and the interior of the mold is filled with the resin, whereupon injection is completed. After the interior of the mold becomes full of the resin, the driving position (pressurizing state) of the injecting drive cylinder 5 is held for a predetermined period of time, and pressurization by the injection screw 2 holds (maintains) the pressure of the resin in the resin path 6 and the holding pressure path 9 (primary holding pressure process).

In the state shown in FIG. 3C, as indicated by the period from the time t1 until time t2 in FIG. 4, the pressurizing state of the injecting drive cylinder 5 is held as shown at portion (a) of the chart, the advancing speed of the injection screw 2 lowers as shown at portion (e) of the chart, and the retracting position of the holding pressure plunger 22 is maintained as shown at portion (f) of the chart.

That is, after injection into the mold is completed, shutoff of the resin path 6 by the shutoff plunger 12 is released and, in this state, driving of the injecting drive cylinder 5 keeps the injection screw 2 pressurized to maintain the pressure of the resin in the resin path 6 and the holding pressure path 9. When the resin is charged into the mold by the injecting drive cylinder 5, the resin is flowed into the holding pressure path 9, and pressurization by the injection screw 2 is maintained to carry out holding pressure (dwelling). Thus, the holding pressure drive cylinder 24 of a small size can be used. Moreover, a configuration in which the resin is flowed into the holding pressure path 9 forcibly by control is not adopted. Thus, a negative pressure is suppressed, so that air bubbles, silver streaks or the like can be inhibited from occurring.

Figure 3D:
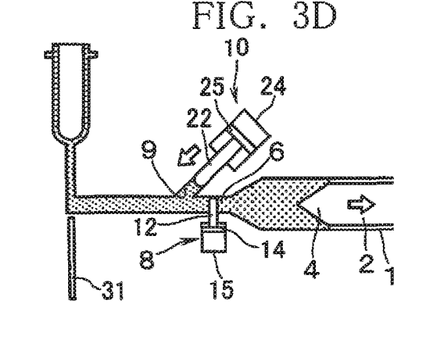

As shown in FIG. 3D, driving of the shutoff drive cylinder 14 brings the shutoff plunger 12 into an advanced state (closed state), while the holding pressure drive cylinder 24 exerts a pressing force to pressurize the holding pressure plunger 22. Under the pressing force of the holding pressure plunger 22, the pressure of the resin in the resin path 6 and the holding pressure path 9 is held (maintained: secondary holding pressure process). During the period in which the resin path 6 is closed by the shutoff plunger 12 and the pressure of the resin in the resin path 6 and the holding pressure path 9 is maintained by the holding pressure plunger 22, the injecting drive cylinder 5 is reduced in pressure and the injection screw 2 is moved backward while rotating. Charging (metering) of a resin for next injection is started immediately.

In the state shown in FIG. 3D, as indicated by the period from the time t2 until time t4 in FIG. 4, the pressurizing state of the injecting drive cylinder 5 is held for a predetermined time, where after the injecting drive cylinder 5 is reduced in pressure, and the injection screw 2 makes a backward movement as shown at portion (a) of the chart. After the pressurizing state of the injecting drive cylinder 5 lasts for the predetermined time and the resin path 6 is closed with the shutoff plunger 12 (time t3), the holding pressure drive cylinder 24 begins to exert a pressing force, and its pressurization is held as shown at portion (b) of the chart. The injection screw 2 begins to move backward as shown at portion (e) of the chart, and the shutoff plunger 12 recedes to open the resin path 6. Then, the holding pressure plunger 22 moves forward by a predetermined amount to maintain the forward movement position as shown at portion (f) of the chart.

After the holding pressure plunger 22 maintains the pressure of the resin in the resin path 6 and the holding pressure path 9, charging (metering) of the resin for next injection can be started immediately. Thus, the charging time can be ensured sufficiently, and the rotational speed of the injection screw 2 can be lowered. Furthermore, the barrel whose temperature is to be set can be lowered in temperature, and the occurrence of acetaldehyde can be decreased.

Figure 3E:
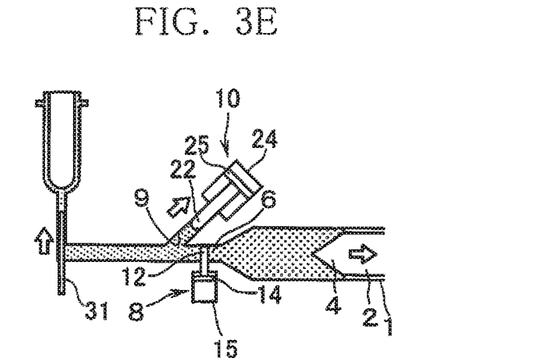
Figure 3F:
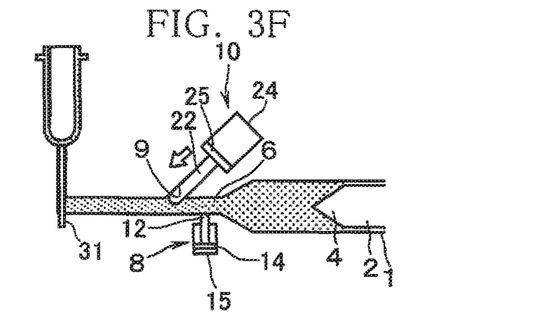

As shown in FIG. 3E, the shutoff member 31 on the mold side is closed to shut off the path, and the pressing force of the holding pressure drive cylinder 24 is reduced, whereby the pressing force of the holding pressure plunger 22 is once released. Then, as shown in FIG. 3F, the shutoff drive cylinder 14 is driven to retract the shutoff plunger 12, thereby releasing the shutoff of the resin path 6 (opening the resin path 6). A pressing force is exerted again by the holding pressure drive cylinder 24 to move the holding pressure plunger 22 forward until its tip projects into the resin path 6 and discharge all the resin in the holding pressure path 9 to the resin path 6.

In the state shown in FIG. 3E, as indicated by the period from the time t4 until time t5 in FIG. 4, the pressing force by the holding pressure drive cylinder 24 is once reduced as shown at portion (b) of the chart, and the shutoff member 31 on the mold side is closed as shown at portion (d) of the chart. The backward movement of the injection screw 2 is continued as shown at portion (e) of the chart, and the holding pressure plunger 22 is once moved backward as shown at portion (f) of the chart. As indicated by the period from the time t5 until time t6 in FIG. 4, the application of the pressing force by the holding pressure drive cylinder 24 is started again as shown at portion (b) of the chart, and the shutoff plunger 12 is opened as shown at portion (c) of the chart. In the state shown in FIG. 3F, backward movement of the injection screw 2 is continued as shown at portion (e) of the chart, and the holding pressure plunger 22 moves forward until its tip projects into the resin path 6 as shown at portion (f) of the chart.

That is, the resin path 6 is closed with the shutoff plunger 12, whereupon the holding pressure (dwelling) of the resin path 6 and the holding pressure path 9 is continued using the holding pressure plunger 22. Then, the shutoff member 31 on the mold side is closed, and the pressing force of the holding pressure plunger 22 is once released. By so doing, the molten resin can be maintained in the optimum state, also at a time when the molded product is removed from the mold. After the pressing force of the holding pressure plunger 22 is once released, shutoff by the shutoff plunger 12 is released to open the resin path 6, and the pressing force is exerted again on the holding pressure plunger 22 to move the holding pressure plunger 22 forward until its tip projects into the resin path 6, thereby discharging the resin.

With the above-described injection device, when the resin in the resin path 6 is made to have its pressure maintained, pressurization by the injection screw 2 moves the holding pressure plunger 22 backward under the pressure of the resin to flow the resin into the holding pressure path 9, and pressurizes the resin in the resin path 6 (primary holding pressure process). The shutoff plunger 12 is closed to pressurize the resin in the resin path 6 and the holding pressure path 9 by the holding pressure plunger 22 (secondary holding pressure process). Further, the shutoff plunger 12 is opened, and the holding pressure plunger 22 is moved forward until its tip projects into the resin path 6 to discharge all the resin in the holding pressure path 9 to the resin path 6. In this manner, the resin is held with respect to the resin path 6 toward the injection screw 2 as compared with the shutoff plunger 12.

Thus, all the resin in the holding pressure path 9 can be reliably discharged to the resin path 6, and residence of the resin in the holding pressure path 9 can be eliminated. As a result, resin residence in the resin well of the holding pressure path 9 can be eliminated. Moreover, the resin can be held in the resin path 6 on the side of the injection screw 2 as compared with the shutoff plunger 12. Thus, the resin in the holding pressure path 9 can be discharged to the resin path 6 reliably with an extremely simple structure, without the use of an extensive mechanism. It becomes possible, therefore, to reliably eliminate the residence of the resin in the holding pressure mechanism (holding pressure path 9) and suppress burn marks.

In the foregoing embodiment, the holding pressure plunger 22 is moved forward until its tip projects into the resin path 6 to discharge all the resin in the holding pressure path 9 to the resin path 6. However, it is conceivable, as another embodiment, to render the leading end of the holding pressure plunger 22 during forward movement coplanar with the inner wall of the resin path 6, thereby discharging all the resin in the holding pressure path 9 to the resin path 6 to eliminate the residence of the resin.

INDUSTRIAL APPLICABILITY

The present invention can be utilized in the industrial fields of injection devices and resin injection methods.

EXPLANATIONS OF LETTERS OR NUMERALS

1 Injection cylinder
2 Injection screw
3 Injection nozzle
4 Screw head
5 Injecting drive cylinder
6 Resin path
8 Shutoff device
9 Holding pressure path
10 Holding pressure device
11 Shutoff cylinder
12 Shutoff plunger
13 Piston rod portion
14 Shutoff drive cylinder
15 Shutoff piston
21 Holding pressure cylinder
22 Holding pressure plunger
23 Piston rod portion
24 Holding pressure drive cylinder
25 Holding pressure piston
31 Shutoff member Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A resin injection method for injecting a resin from an injection nozzle through a resin path and flowing the resin into a holding pressure path communicating with the resin path to maintain a first pressure of the resin in the resin path and the holding pressure path, comprising the steps of:
    (a) maintaining the first pressure of the resin in the resin path and the holding pressure path by pressurization of a holding pressure device from the resin path side during a predetermined time;
    (b) then shutting off the resin path and maintaining a second pressure of the resin in the holding pressure path by pressurization from the holding pressure path side;
    (c) after the step (b) of maintaining the second pressure of the resin in the resin path and the holding pressure path by pressurization of the holding pressure device from the holding pressure path side, shutting off an inlet path for the resin on a mold side and releasing pressurization from the holding pressure path side once; and
    (d) opening the resin path and discharging all the resin held in the holding pressure path to the resin path under pressure by further pressurizing in the holding pressure path to thereby discharge all the resin in the holding pressure path to the resin path.

2. The resin injection method according to claim 1, wherein during the step (d) the tip site of the holding pressure device is projected into the resin path from the holding pressure path for discharging all the resin in the holding pressure path to the resin path.

3. The resin injection method according to claim 1, wherein the first pressure and the second pressure are equal to each other.

4. The resin injection method according to claim 1, wherein pressurizing the resin in the resin path is performed by an injection cylinder during the step (a) of maintaining the first pressure of the resin in the resin path and the holding pressure path by pressurization from the resin path side.

5. A resin injection method for injecting a resin from an injection nozzle through a resin path, by advancing a resin injection device, and flowing the resin into a holding pressure path communicating with the resin path to maintain a first pressure of the resin in the resin path and the holding pressure path, the method comprising the steps of:

(a) putting a holding pressure device, for selectively advancing in the holding pressure path to apply pressure in the holding pressure path, or a pressure holding position to maintain pressure in the holding pressure path, or to retract to reduce pressure in the pressure holding path, into a free state where the holding pressure device is responsive to pressure in the resin path to retract;

(b) while the pressure holding device is in a free state, advancing the resin injection device to apply pressure in the resin path during an initial time ($t_0$) to a first time ($t_1$), during which time a shutoff plunger for shutting off resin flow in the resin path upstream of the holding pressure device is kept in an open position and a shutoff member for shutting off resin flow in the resin path downstream of the holding pressure device on a mold side thereof is kept in an open position, to charge the holding pressure path with resin and to fill the mold with resin;

(c) at the first time ($t_1$) continuing to advance the resin injection device until a second time ($t_2$) while the pressure holding device maintains position;

(d) at the second time ($t_2$) closing the shutoff plunger while the shutoff member remains open and the injection device maintains position and while the holding pressure device maintains position;

(e) at a third time ($t_3$) keeping the shutoff plunger closed and keeping the shutoff member open and again advancing the holding pressure device;

(f) after the third time ($t_3$) and before a fourth time ($t_4$), stopping the advance of the holding pressure device and subsequently thereto retracting the injection device until the fourth time ($t_4$) for charging the injection device;

(g) at the fourth time ($t_4$) closing the shutoff member and maintaining the shutoff plunger closed, and continuing to retract the injection device while again retracting the holding pressure device; and (h) at a fifth time ($t_5$) ceasing retraction of the holding pressure device and again advancing the holding device, opening the shutoff plunger while maintaining the shutoff member closed, and continuing to retract the injection device.

6. The resin injection method according to claim 5, wherein in the step (h), the pressure holding device is advanced until a tip of the pressure holding device extends into the resin path.

7. The resin injection method according to claim 6, wherein in the step (f), the pressure holding device is advanced less than in the step (h).

* * * * *